(12) United States Patent
Cernasov et al.

(10) Patent No.: US 7,598,998 B2
(45) Date of Patent: Oct. 6, 2009

(54) METHOD AND SYSTEM FOR INCREASING THE EFFECTIVE DYNAMIC RANGE OF A RANDOM-ACCESS PIXEL SENSOR ARRAY

(75) Inventors: Andrei Cernasov, Ringwood, NJ (US); Fernando De La Vega, Ridgefield Park, NJ (US)

(73) Assignee: Honeywell International Inc., Morristown, NJ (US)

(*) Notice: Subject to any disclaimer, the term of this patent is extended or adjusted under 35 U.S.C. 154(b) by 658 days.

(21) Appl. No.: 11/239,245

(22) Filed: Sep. 30, 2005

(65) Prior Publication Data
US 2007/0076012 A1 Apr. 5, 2007

(51) Int. Cl.
H04N 3/14 (2006.01)
H04N 5/235 (2006.01)

(52) U.S. Cl. ............... 348/362; 348/221.1; 348/229.1; 348/297

(58) Field of Classification Search ............ 348/220.1, 348/221.1, 222.1, 229.1, 230.1, 231.99, 234, 348/235, 236, 237, 238, 241, 250, 254, 294, 348/295, 297, 298, 362, 364, 365, 311
See application file for complete search history.

(56) References Cited

U.S. PATENT DOCUMENTS

| | | | |
|---|---|---|---|
| 5,461,425 A | 10/1995 | Fowler et al. | 348/294 |
| 6,157,016 A | 12/2000 | Clark et al. | 250/208.1 |
| 6,175,383 B1 | 1/2001 | Yadid-Pecht et al. | 348/302 |
| 6,447,852 B1 | 9/2002 | Gordeev et al. | 425/577 |
| 6,587,145 B1 | 7/2003 | Hou | 348/297 |
| 6,977,685 B1 * | 12/2005 | Acosta-Serafini et al. | 348/308 |
| 7,158,180 B2 * | 1/2007 | Neidrich | 348/340 |
| 2006/0007498 A1 * | 1/2006 | McDermott | 358/296 |
| 2007/0216794 A1 * | 9/2007 | Neidrich | 348/335 |

* cited by examiner

*Primary Examiner*—David L Ometz
*Assistant Examiner*—Peter Chon
(74) *Attorney, Agent, or Firm*—Ingrassia Fisher & Lorenz, P.C.

(57) ABSTRACT

To effective increase the dynamic range of a pixel array, a plurality of brightness groups is set. The pixels of a pixel array are then distributed among the groups according with their likely brightness. Each image frame is scanned in the order of brightness, with the pixels in the group likely to be the brightest being scanned first and the pixels in the group likely to be the darkest being scanned last. The brightness groups are adjusted at the boundary of the frame scan.

16 Claims, 5 Drawing Sheets

METHOD AND SYSTEM FOR INCREASING THE EFFECTIVE DYNAMIC RANGE OF A RANDOM-ACCESS PIXEL SENSOR ARRAY

FIELD

This invention relates generally to the capture and processing of image data. More particularly, embodiments relate to the capture and processing of image data from a random-access pixel array.

DESCRIPTION OF THE RELATED ART

Digital cameras are electronic devices that capture images using an array. Initially, this array was implemented using charge coupled devices (CCD). However, complementary metal oxide semiconductor (CMOS) arrays are replacing CCD arrays. CMOS arrays may offer a higher density of sensors and a larger dynamic range of than CCD arrays. Accordingly, CMOS arrays may provide more shadow detail and highlight detail with less color distortion from uncontrolled light sources.

The operation of a typical CMOS active pixel sensor (APS) 400 is shown in FIG. 4. A pixel read cycle may start with the assertion of the reset line 405 which opens transistors M1 410 and sets the voltage across the detecting photodiode 417 to a predetermined level, $V_{RES}$ 415. A corresponding charge is then stored on the junction capacitance of the reverse-biased photodiode and on the other associated capacitances.

During pixel integration time, a fraction of the photons absorbed in the depletion region of the APS 400 generate carrier pairs, which in turn discharge the equivalent capacitance of the cells of an array. The brightness of the pixel may be evaluated (read) by measuring the time it takes for this capacitance to discharge to a given $V_{ref}$ (saturation level). The voltage across the capacitance is tracked by the voltage follower M2 422 and is sampled by the read line 420, which turns transistor M3 425 on. For images containing both very bright areas and very dark areas the very bright pixels may reach saturation before they are read by the associated electronics and the signals provided by the very dark pixels may give too low to provide an acceptable image resolution. The effective dynamic range of the APS design in FIG. 4 may be too low for such applications.

Since incoming images are random, there is no way to knowing ahead of time when any of the pixels in a large array will reach saturation. One possible solution is to continuously monitor the signal integration process for all the pixels in the large array and allow the integration of each pixel to continue for the necessary but sufficient amount of time required to obtain the desired output resolution. However, there are drawbacks to this solution. For instance, the significant cost and complexity of the circuitry needed to support the required bandwidth.

Another conventional solution is to attach comparators to each pixel. As the pixel is read, the signal is passed through an associated comparator. If the comparator outputs a "1", the pixel reached saturation. The outputs of the comparators are continuously shifting out in a serial manner. A downstream DSP or similar processing platform detects the 1's in the output stream and calculates the addresses of the saturated pixels. However, this solution requires additional circuitry and another processor, which adds to the complexity of the overall device. Accordingly, the cost of the overall device increases.

Yet another conventional solution is to arrange the pixels in a content addressable memory ("CAM") structure. For each brightness level, pixels are interrogated in the pixel array to determine whether saturation has been reached. The responses are queued and the brightness levels are then stored at those pixel addresses within an output image buffer. Similarly, this solution requires significant additional circuitry (mostly in the CAM structure itself) and additional processing time for the querying of the pixels, which adds to the processing time and complexity of the overall device. Accordingly, the cost of the device may increase and a possible decrease in performance of the pixel array may result.

Yet other solutions include integrating a full comparator and counter subsystem at each pixel location. Finally, other solutions include using a global counter with a local comparator and a local register for each pixel. Again, these solutions may suffer similar drawbacks and disadvantage as the previously described solutions.

SUMMARY

An embodiment generally relates to a method of increasing the effective dynamic range of a random access pixel array. The method includes setting a plurality of brightness groups. The method also includes assigning pixels in the pixel array to brightness groups based on past values of their scanned brightness, where pixels with comparable brightness values are assigned to a common group and pixels with relatively different brightness values to different groups. The method further includes scanning the pixel array in the order of brightness groups, starting with the pixels in the group containing the brightest pixels, following with the pixels in the group containing the next relatively darker pixels and ending with the group containing the darkest pixels. The method yet further includes updating the group assignments of the pixels in the array.

Another embodiment generally pertains to a system for effectively increasing a dynamic range of a random-access pixel sensor array. The system includes a pixel array and a plurality of memory maps, each memory map configured to store pixel addresses that access pixels in the pixel array. The plurality of memory maps is ordered by brightness level. The system also includes a controller configured to interface with the pixel array and the plurality of memory maps, where the controller is also configured to scan the plurality of memory maps based on brightness level of the plurality of memory maps.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
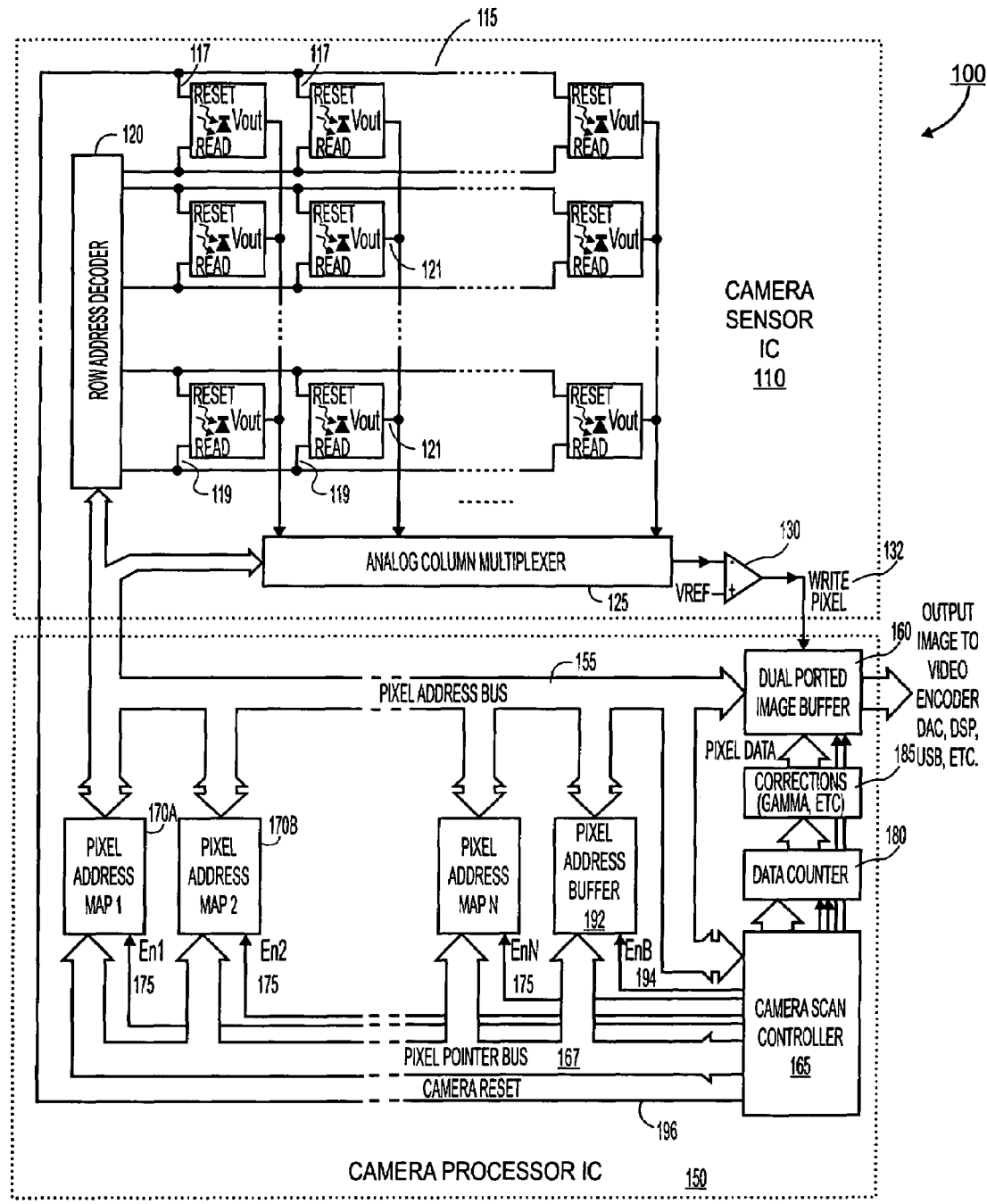
FIG. 1 illustrates a block diagram of an exemplary sensor and camera processor module in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of random-access pixel array systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the invention generally relate to a method and system for increasing the effective dynamic range of random access pixel sensor arrays. This is achieved by replacing the standard raster scan with an intelligent scan consisting in reading those pixels that are most likely to be the brightest pixels first, then the ones likely to be next brightest next, and finally the pixels that are likely to be the darkest last. Classification by brightness probability is made possible by the availability of a track record for the captured image stream and by the limited response time of the eye.

More particularly, a camera processor module may be configured to include memory maps (MPs) of the random-access pixel array and a single global data counter. Each memory map may include a scan counter, which may be predetermined or set dynamically by a system. Moreover, the memory maps are associated with a respective brightness level range, i.e., bright to dark. A processor in the processor module may process the pixel array by the memory maps in order from brightest to darkest, where each memory map includes pixel addresses. The processor module may be collocated with the pixel sensor array or may reside on a separate circuit board or within a separate integrated circuit.

At the start of a read image (frame) cycle, the pixels in the array are reset and the data counter is loaded with its initial (maximum) value. The processor may be configured to read sequentially the addresses contained in the first memory map which stores the addresses of the brightest pixels in the array. The processor may be configured to retrieve the value for a pixel at a selected address and compare the value to a saturation level value. If the pixel is at saturation, the processor generates a write pixel signal. The write pixel signal stores the value of the data counter corrected for nonlinearities (e.g., gamma) at the pixel address in a dual ported image buffer. The pixel address may also be marked with a pixel read flag. As a result, the pixel addresses with pixel read flags are not subsequently processed by scans in the memory maps until the next frame cycle. After each scan is completed, the data counter is decremented.

After a predetermined number of scans are completed on a selected memory map, the remaining addresses (still unsaturated pixels) are moved to the pixel address buffer. These pixel addresses in the pixel address buffer point to pixels that are too dark for the current memory map and are moved down to a "darker" memory map at the end of the frame read cycle. For the pixel addresses that were saturated on the first scan of a memory map, these pixel addresses are also moved to pixel address buffer. For these pixel addresses point to pixels that are too bright for the current memory and are moved up to "brighter" memory map at the end of the frame read cycle. After all the scans allocated to the first (brightest) memory map are completed the scans allocated to the next (darker) memory map commence. The process is repeated, from the brightest memory map to the darkest memory map, until all pixels are read or the data counter reaches its predetermined minimum value, i.e., the end of the read image (frame) cycle. Subsequently, the limits of the data counter may be adjusted by a user or dynamically by the controlling system.

FIG. 1 illustrates a diagram of an exemplary camera system 100 where an embodiment may be practiced. It should be readily apparent to those of ordinary skill in the art that the camera system 100 depicted in FIG. 1 represents a generalized schematic illustration and that other components may be added or existing components may be removed or modified. Moreover, the camera system 100 may be implemented using software components, hardware components, or combinations thereof.

As shown in FIG. 1, the camera system 100 includes a camera sensor integrated circuit (IC) 110 and a camera processor IC 150. The camera sensor 110 may further include a pixel array 115, a row address decoder 120, an analog column multiplexer 125 and a comparator 130. These components are well-known to those skilled in the art.

Figure 4:
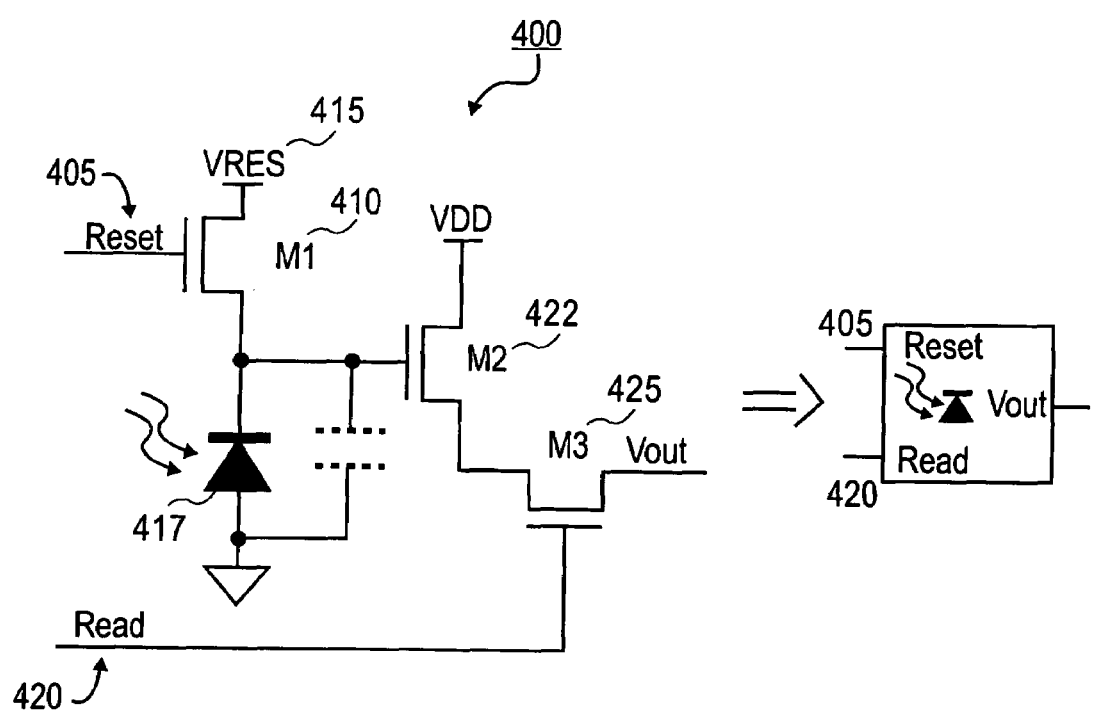
FIG. 4 illustrates a conventional CMOS active pixel sensor.

The pixel array 115 may be configured to capture image data. The pixel array 115 may be implemented using CMOS active pixel sensor (APS), as previously described with respect to FIG. 4. The reset lines 117 of the APS may be connected to camera reset line 196, which then set resets the APS. The read lines 119 of a single row may be connected with a respective output line of the row address decoder 115. The $V_{out}$ lines 121 of a column in the pixel array 115 may be connected with a respective input of the analog column multiplexer 125. Although FIG. 1 depicts the pixel array 115 as a CMOS pixel array, other semiconductor pixel arrays, e.g., TTL, TFT, CCD, etc, may also be used as long as random access is provided for the pixel array.

The row address decoder 120 may be configured to interface with a pixel address bus 155 from the camera processor IC 150. More particularly, the row address decoder 120 may receive the bits of a pixel address bus 155 that designate the row address of a pixel in the pixel array 115. The analog column multiplexer 125 may also be configured to interface with the pixel address bus 155 from the camera processor IC 150. More specifically, the select lines of the analog column multiplexer 125 may receive the bits of the pixel address bus 155 that designate the column of the desired pixel. The output of the analog column multiplexer 125 may be one of the inputs to the comparator 130. The other input of the comparator may be set $V_{REF}$. Accordingly, when the output of pixel matches the $V_{REF}$, a write pixel signal 132 is generated by the comparator 130, which is then an input to a dual ported image buffer 160 included in the camera processor IC 150.

The camera processor IC 150 may include the pixel address bus 155, the dual ported image buffer 160, a camera scan controller 165, a pixel pointer bus 167, a plurality of pixel address maps 170, pixel address map enable lines (labeled as $E_{n1}$-$E_{nN}$") 175, a data counter 180, a corrections module 185, a pixel address buffer 192 and a pixel address buffer enable line 194 ("labeled as $E_{NB}$").

The camera scan controller 165 may be configured to provide the functionality of the camera processor IC 150. The functionality may be embodied as software (firmware or similar programming construct) program executed by the camera scan controller 165. The camera scan controller 165 may be implemented using a microprocessor, digital signal processor, an application specific integrated circuit or other similar computing platform.

The camera scan controller 165, as described earlier, may be configured to generate a camera reset signal on the camera reset line 196. When the camera reset line 196 is set high, the sensors in the pixel array 115 are reset. The camera scan controller 165 may also be configured to interface with the pixel address maps 170 and the pixel address buffer 192 through the pixel pointer bus 167. The pixel pointer bus 167 may be configured to provide a communication medium between the camera scan controller 165, the pixel address maps 170 and the pixel address buffer 192. The camera scan controller 165 may also generate a memory map enable signal over the pixel address enable line 175. When the pixel address enable line 175 is set, the camera scan controller 165 may access the pixel addresses stored in the respective pixel address maps 170

The camera scan controller 165 may be further configured to generate a pixel address buffer enable signal over the pixel address buffer enable line 194. When the pixel address buffer line 194 is set, the controller scan controller 165 may access the pixel addresses stored with the pixel address buffer 192.

The pixel address maps 170 may be configured to store pixel addresses. The pixel address maps 170 may be implemented using random access memories, dual-ported memories, registers, linked list or other similar data structure. The pixel memory maps 170 contain all the pixel addresses of the pixels in the pixel array 115. The pixel address maps 170 may be ordered by ranges of pixel brightness, as shown in FIG. 2.

The pixel address buffer 192 may also be configured to store pixel addresses. The pixel address buffer 192 may be implemented using random-access memories, dual-ported memories, registers, linked-list or other similar data structure.

Figures 2, 3:
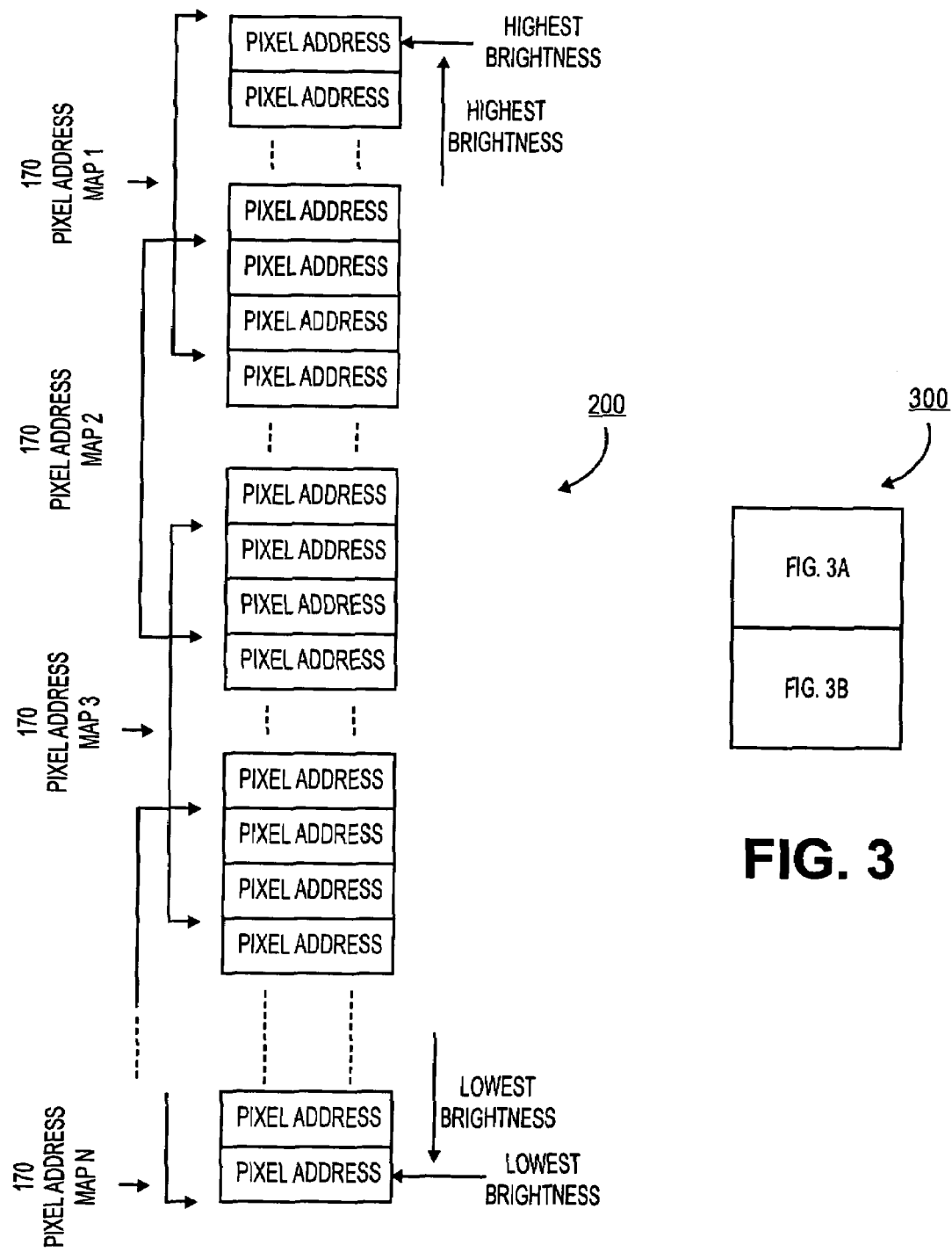
FIG. 2 illustrates a diagram of an exemplary memory map configuration in accordance with the embodiment.
FIG. 3 is a key to FIGS. 3A-B.

FIG. 2 is block diagram 200 showing the ordering of the pixel address maps 170 in accordance with an embodiment. As shown in FIG. 2, the pixel address maps 170 contain the pixel addresses. The pixel address maps 170 may be ordered by an average brightness of the pixels whose addresses contain therein. In other words, pixel address map $170_1$ may be designated with the highest brightness level. Pixel address map $170_2$ may be designated with the second highest brightness level and so forth until pixel address map $170_N$ is designated with the lowest brightness level. In some embodiments, the pixel addresses within a pixel address map 170 may also be ordered by brightness levels. For these embodiments, an increase in computation power may be required by the camera processor IC 150. In other embodiments, the pixel addresses may not be sorted, i.e., a random distribution of pixel addresses.

In an initial configuration of the pixel address maps 170, the pixel addresses may be distributed to the pixel address maps 170 in a random manner or a predefined pattern. As an image is processed, the pixel addresses are sorted into their appropriate pixel address map $170_X$.

The pixel address maps 170 may be further configured to include a scan counter (not shown). The scan counter may be used by the camera scan controller 165 to ensure that an appropriate number of scans are performed for each memory map 170. Once the limit is reached for scans, the camera scan controller 165 may process the next pixel address map. The camera scan controller 165 may also include a pixel address map counter (not shown). This counter may be configured to track which pixel address map is being processed, where the range of the counter ranges from 1 to N, the number of pixel address maps.

Returning to FIG. 1, the pixel address buffer 192 may be configured to store a partial set of pixel addresses from the pixel address maps 170. More specifically, after a predetermined number of scans are completed on a selected pixel address map, the remaining addresses (the unsaturated pixels) are moved to the pixel address buffer 192. These pixel addresses point to pixels that are too dark for the current pixel address map and are moved down to a "darker" memory map at the end of the frame read cycle. For the pixel addresses that were saturated on the first scan of the current pixel address map, these pixel addresses are also moved to pixel address buffer 192. For these pixel addresses point to pixels that are too bright for the current pixel address map and are moved up to "brighter" pixel address map at the end of the read cycle.

The data counter 180 may be interfaced with the camera scan controller 165. The data counter 180 may be configured to provide a pixel value for those pixels reaching saturation. More particularly, when a pixel has reached saturation, the comparator 130 may assert the write pixel line 132. The dual ported image buffer 160 may be configured to store the value of the data counter 180 corrected for nonlinearities by the correction module 185 at the pixel address asserted on the pixel address bus 155 by the camera scan controller 165. As described earlier, the corrections module 185 may be configured to correct for nonlinearities between the value of the data counter 185 and the amount of power received by the pixel array 115.

Figure 3A:
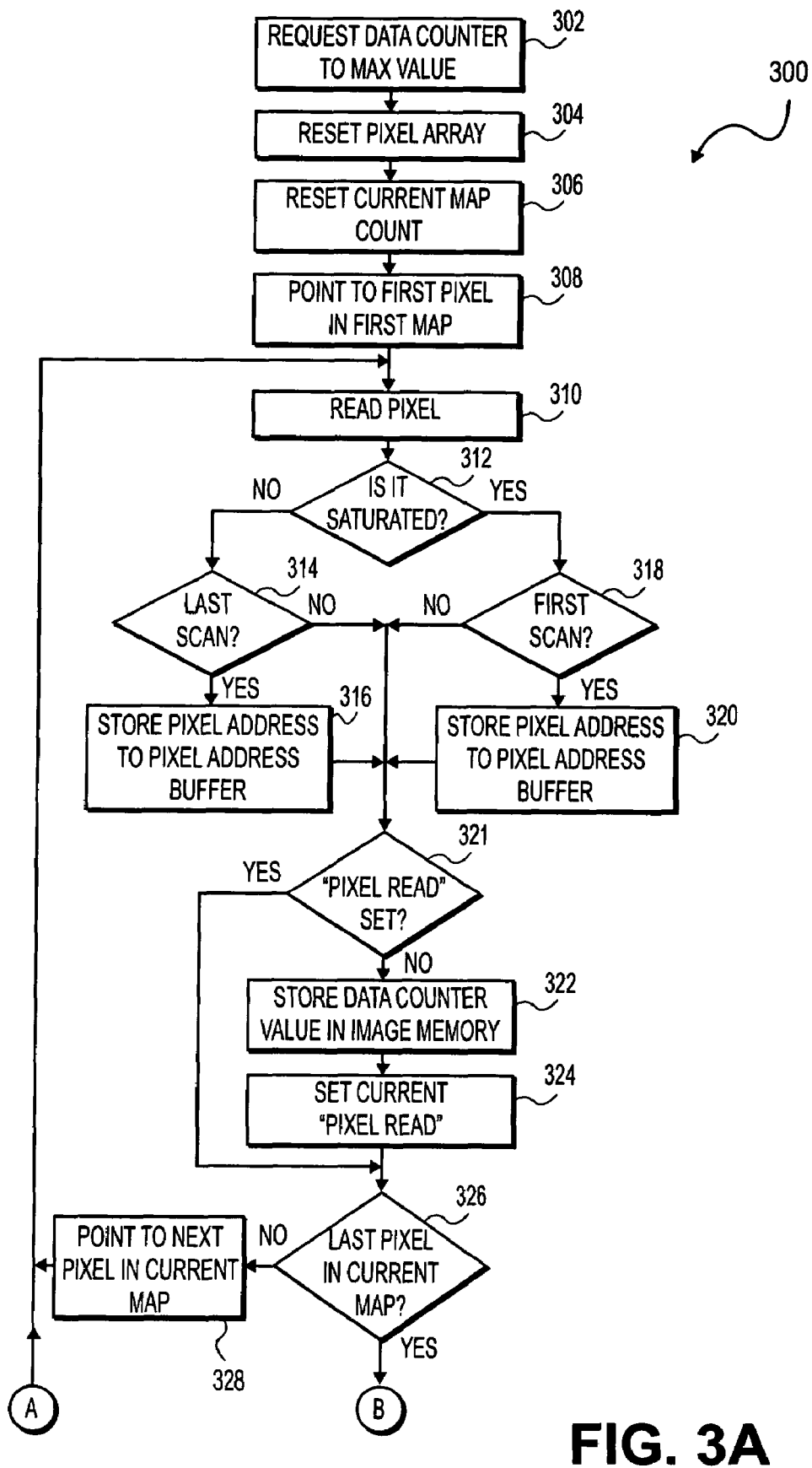
FIGS. 3A-B illustrate an exemplary flow diagram implemented in accordance with the embodiment.
Figure 3B:
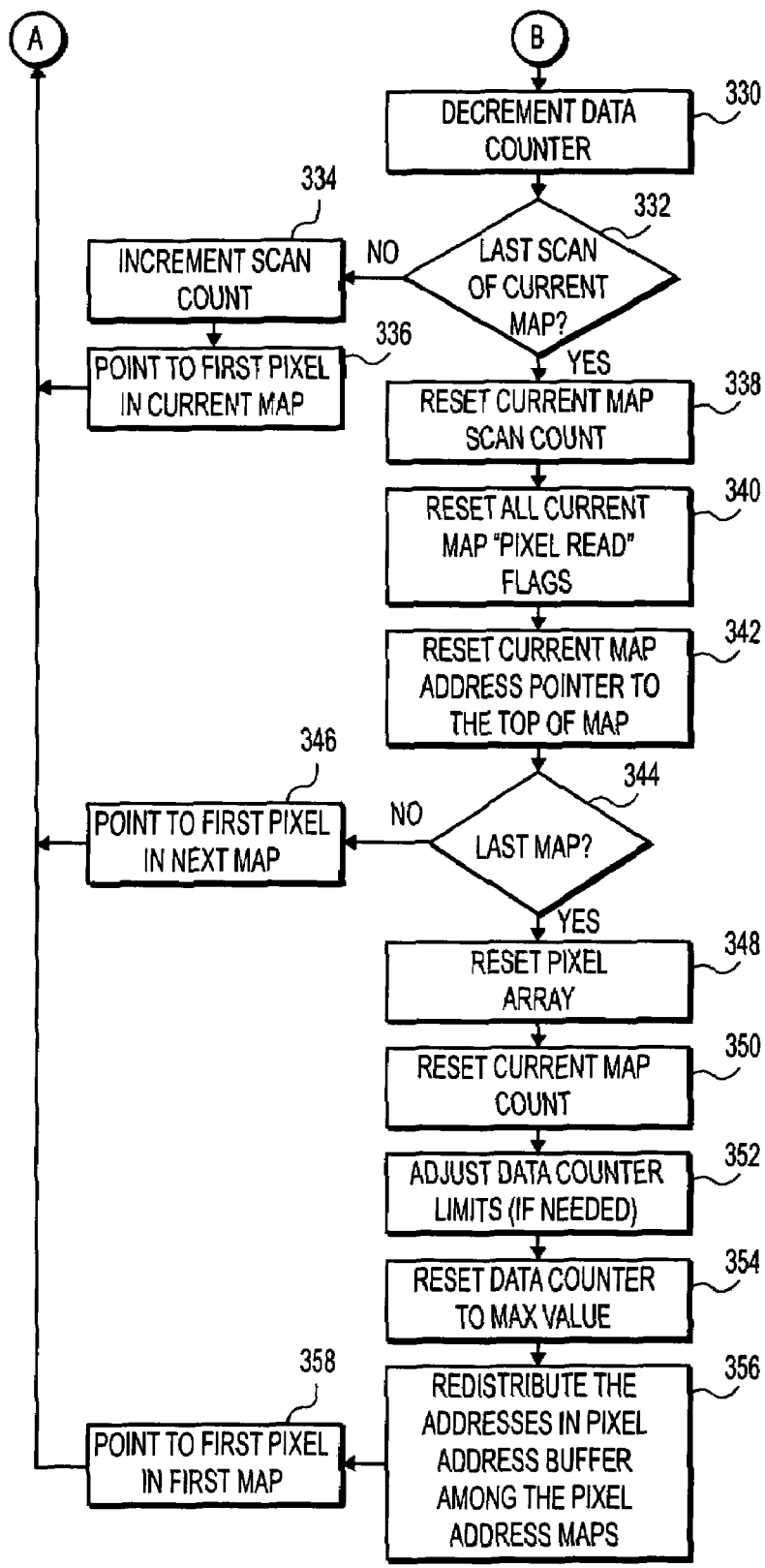

FIGS. 3A-B is flow diagram 300 implemented by an exemplary embodiment of the camera scan controller 165. It should be readily apparent to those of ordinary skill in the art that the flow diagram 300 depicted in FIG. 3 represents a generalized schematic illustration and that other steps may be added or existing steps may be removed or modified.

As shown in FIG. 3A, the camera scan controller 165 may be configured to reset the data counter 180, in step 302. In step 304, the camera scan controller 165 may be configured to assert the camera reset line 196 high to reset the pixel array 115.

In step 306, the camera scan controller 165 may be configured to reset the current map count. More particularly, the camera scan controller 165 may keep a buffer or location to store the current map count. The current map count may designate which pixel address map 170 is being processed. The current map count may be initialized at one and range to N, the number of pixel address maps.

In step 308, the camera scan controller 165 may be configured to point to a first pixel in the first pixel address map $170_1$. More particularly, the camera scan controller 165 may assert the pixel address map enable line $175_1$ high, which enables access to the pixel address map $170_1$. Subsequently, the camera scan controller 165 may assert a value on the pixel point bus 167, which selects the first pixel address stored in the pixel address map $170_1$. The pixel address is asserted on the pixel address bus 155. The row portion of the pixel address may be inputted into the row address decoder 120 to select the appropriate row in the pixel array 115. The column portion of the pixel address may be asserted on the select lines of the analog column multiplexer 125 to select the appropriate $V_{out}$.

In step 310, the camera scan controller 165 may be configured to read $V_{out}$ of the selected pixel address. More specifically, the $V_{out}$ of the selected pixel may be inputted to the comparator 130.

In step 312, the camera scan controller 165 may determine whether the $V_{out}$ of the selected pixel has reached saturation. If the selected pixel has not reached saturation, the camera scan controller 165 may determine whether this is the last scan for the selected pixel address map, in step 314. If the scan count indicates that it is the last scan for the selected pixel address map, the camera scan controller 165 may be configured to store the pixel address to the pixel address buffer to be later moved to a brighter pixel address map, if possible. Subsequently, the camera scan controller 165 may proceed to the processing of step 321. Otherwise, if the scan count indicates that the current scan is not the last scan, the camera scan controller 165 may proceed to the processing of step 321.

Returning to step 312, if the selected pixel has reached saturation, the camera scan controller 165 may be configured to determine whether the current scan is the first scan, in step 318. If the current scan is not the first scan, the camera scan controller 165 may proceed to the processing of step 321. Otherwise, if the current scan is the first scan, the camera scan controller 165 may be configured to store the pixel address to the pixel address buffer 192, to be later moved to a brighter pixel address map at the end of the read cycle. If this is the first pixel address map $170_1$, the pixel addresses of these "bright" pixels will remain therein.

In step 321, the camera scan controller 165 may be configured to determine whether a "pixel read" flag has been set for the selected pixel. The pixel address maps may contain a memory structure which allows for a bit to be set that indicates whether or not a pixel has been read. If the pixel read flag has been set, the camera scan controller 165 may proceed to the processing associated with step 326. Otherwise, if the pixel read flag has not been set, the camera scan controller 165 may be configured to store the current value of the data counter 180 in the dual ported image buffer 160 at the pixel address asserted on the pixel address bus 155, in step 322. Subsequently, in step 324, the camera scan controller 165 may set the pixel read flag for the selected pixel.

In step 326, the camera scan controller 165 may be configured to determine whether the last pixel has been read in the current map. If the current pixel is not the last pixel, the camera scan controller 165 may be configured to assert the next pixel map address on the pixel pointer bus 167, in step 328. Subsequently, the camera scan controller 165 may return to the processing of step 310.

Otherwise, referring to FIG. 3B, if the current pixel is the last pixel in the selected pixel address map, in step 330, the camera scan controller 165 may be configured to decrement the data counter 180. In step 332, the camera scan controller 165 may be configured to determine whether the current scan is the last scan of the selected pixel address map. If the current scan is not the last scan, camera scan controller 165 may increment the scan count, in step 334. In step 336, the camera scan controller 165 may assert the first pixel map address in the current pixel address map on the pixel pointer bus 167. Subsequently, the camera scan controller 165 may proceed to the processing of step 310 (See FIG. 3A).

Otherwise, returning to step 332, if the current scan is the last scan, the camera scan controller 165 may reset the scan count for the current pixel address map, in step 338. In step 340, the camera scan controller 165 may also reset the "pixel read" flags for the current pixel address map.

In step 342, the camera scan controller 165 may reset the current pixel address map pointer to the top of the pixel address map. In step 344, the camera scan controller 165 may be configured to determine whether the current pixel address map is the last pixel address map. If the current pixel address map is not the last pixel address map, the camera scan controller 165 may assert the pixel map address enable line for the next pixel address map, in step 346. Moreover, the camera scan controller 165 may also assert the first pixel map address on the pixel pointer bus 167.

Otherwise, if the current scan is the last scan, the camera scan controller 165 may be configured to assert the camera rest line 196 high to reset the pixel array 115. In step 350, the camera scan controller 165 may reset the map count, which tracks the pixel address map being accessed by the camera scan controller 165.

In step 352, the camera scan controller 165 may dynamically adjust the limits of the data counter 180, if needed. In other embodiments, a user may adjust the limits. For example, the camera scan controller 165 may prompt the user to adjust the range and/or clock frequency of the data counter 180. In step 354, the camera scan controller 165 may reset the data counter to the maximum value.

In step 356, the camera scan controller 165 may distribute the addresses in the pixel address buffer 192 among the pixel address maps. More particularly, as previously described, the pixel address buffer 192 may contain pixel addresses of pixels that are too dark for the current pixel address map. These pixels would be moved to a "darker" pixel address map. The pixel address buffer 192 may also contain pixel addresses of pixels that are too bright for the current pixel address map. These pixels would be moved to a "brighter" pixel address map.

In step 358, the camera scan controller 165 may be configured to assert the first pixel map address on the pixel point bus 167 and set the first pixel address map enable line high. Subsequently, the camera scan controller 165 returns to the processing of step 310.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of increasing the effective dynamic range of a random access pixel array, the method comprising:

setting a plurality of brightness groups;

assigning pixels in the pixel array to brightness groups based on past values of their scanned brightness, wherein pixels with comparable brightness values are assigned to a common group and pixels with relatively different brightness values to different groups;

scanning the pixel array in the order of brightness groups, starting with the pixels in the group containing the brightest pixels, following with the pixels in the group containing the next relatively darker pixels and ending with the group containing the darkest pixels; and updating the group assignments of the pixels in the array.

2. The method of claim 1, further comprising providing for a plurality of memory maps, each memory map associated with one of the plurality of brightness groups and each memory containing a plurality of array pixel addresses.

3. The method of claim 2, further comprising:

sorting a partial set of pixel addresses of a current memory map into two categories, a first category for pixel addresses being too dark for the current memory map and a second category for pixel addresses being too bright for the current memory map; and updating the plurality of memory maps with the first and second categories.

4. The method of claim 3, further comprising:

providing for a data counter, wherein the data counter decrements in units of pixel saturation level;

selecting a pixel address from a current memory map;

retrieving a value of the pixel at the pixel address;

comparing the value of the pixel at the address to a reference voltage; and writing the value of the current data counter pixel saturation level processed by nonlinearities to an image memory in response to the value of the pixel at the address at least reaching the reference voltage.

5. The method according to claim 4, further comprising storing the address in a pixel address buffer in response to the comparison of the value of the pixel at the pixel address to the reference voltage occurring on a first scan of the memory map.

6. The method according to claim 5, further comprising:

determining a setting of a pixel read flag;

storing the current pixel saturation level of the data counter in an image memory in response to the pixel read flag not being set; and changing pixel read flag to be set for the pixel.

7. The method according to claim 4, further comprising storing the address in a pixel address buffer in response to the comparison of the value of the pixel at the pixel address not reaching a predetermined pixel saturation level occurring on the last scan of the memory map.

8. The method according to claim 5, further comprising:

determining a setting of a pixel read flag;

storing the current pixel saturation value of the data counter in an image memory in response to the pixel read flag not being set; and changing the pixel read flag to be set for the pixel.

9. The method according to claim 4, further comprising:

determining the status of scans for the current memory map;

determining a setting of a pixel read flag in response to the status of scans for the current memory map being not the last scan;

storing the current pixel saturation value of the data counter in an image memory in response to the pixel read flag not being set; and changing the pixel read flag to be set for the pixel.

10. The method according to claim 9, further comprising:

determining a status of the address of the pixel; and retrieving a next address in response to the status of the address of the pixel not being the last address in the current memory map.

11. The method according to claim 9, further comprising:

determining a status of the address of the pixel;

decrementing the data counter in response to the status of the address of the pixel being the last address in the current memory map; and determining the status of scans for the current memory map.

12. The method according to claim 11, further comprising:

incrementing a scan counter in response to the status of scans not being the last scan; and retrieving a first address of the current memory map.

13. The method according to claim 11, further comprising:

resetting a scan counter in response to the status of scans being the last scan;

resetting all pixel read flags for the selected memory map; and resetting current map address pointer to a first address in the current memory map.

14. A system for effectively increasing a dynamic range of a random-access pixel array, the system comprising:

a pixel array;

a plurality of memory maps, each memory map configured to store pixel addresses that access pixels in the pixel array, wherein the plurality of memory maps are ordered by brightness level; and a controller configured to interface with the pixel array and the plurality of memory maps, wherein the controller is also configured to scan the plurality of memory maps based on a brightness level of the plurality of memory maps, beginning with the brightest level.

15. The system according to claim 14, wherein the controller is further configured to scan a current map memory, sort a partial set of pixel addresses into two categories, a first category for pixel addresses being too dark for the current memory map and a second category for pixel addresses being too bright for the current memory map; and update the plurality of memory maps with the pixel addresses in the first and second categories.

16. The system according to claim 14, further comprising:

a data counter configured to interface with the controller, wherein the data counter decrements in units of pixel saturation level; and a comparator configured to receive voltage output from the pixel array and compare the voltage output with a reference voltage, wherein the controller is further configured to select a pixel address from a selected map memory, direct the output of a pixel at the pixel address to the comparator and store a current saturation level of the data counter in response to the output of the pixel being at least equal to the reference voltage.

* * * * *

UNITED STATES PATENT AND TRADEMARK OFFICE
CERTIFICATE OF CORRECTION

PATENT NO. : 7,598,998 B2  Page 1 of 1
APPLICATION NO. : 11/239245
DATED : October 6, 2009
INVENTOR(S) : Cernasov et al.

It is certified that error appears in the above-identified patent and that said Letters Patent is hereby corrected as shown below:

Column 9, line 15, "categones" should be changed to --categories--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,598,998 B2
APPLICATION NO. : 11/239245
DATED : October 6, 2009
INVENTOR(S) : Cernasov et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twenty-eighth Day of September, 2010

David J. Kappos
*Director of the United States Patent and Trademark Office*